United States Patent
Fedorov et al.

(10) Patent No.: US 6,408,064 B1
(45) Date of Patent: Jun. 18, 2002

(54) METHOD AND APPARATUS FOR ENABLING FULL INTERACTIVE MONITORING OF CALLS TO AND FROM A CALL-IN CENTER

(75) Inventors: Sergey Fedorov, San Bruno; Oleg Bondarenko, San Francisco, both of CA (US)

(73) Assignee: Genesys Telecommunications Laboratories, Inc., San Francisco, CA (US)

( * ) Notice: Subject to any disclaimer, the term of this patent is extended or adjusted under 35 U.S.C. 154(b) by 0 days.

(21) Appl. No.: 09/539,979

(22) Filed: Mar. 31, 2000

Related U.S. Application Data

(62) Division of application No. 09/026,795, filed on Feb. 20, 1998, now Pat. No. 6,047,060.

(51) Int. Cl.[7] .................... H04M 1/82; H04M 3/22; H04M 3/523
(52) U.S. Cl. ................ 379/265.06; 379/32.01; 379/35
(58) Field of Search ............ 379/32.01, 32.04, 379/35, 93.06, 265.06, 265.07, 266.01, 267, 309, 387.01

(56) References Cited

U.S. PATENT DOCUMENTS

| | | | | |
|---|---|---|---|---|
| 5,790,635 A | * | 8/1998 | Dezonno | 379/265 X |
| 5,799,067 A | * | 8/1998 | Kikinis et al. | 379/93.06 |
| 6,047,060 A | * | 4/2000 | Fedorov et al. | 379/265 |

* cited by examiner

*Primary Examiner*—Harry S. Hong
(74) *Attorney, Agent, or Firm*—Donald R. Boys; Central Coast Patent Agency, Inc.

(57) ABSTRACT

An agent station at a telephone call center has a telephone and a computer platform with a sound card. The telephone has a speaker line connected to at least a microphone input at the sound card. In some instances the speaker line is connected to both the microphone and speaker ports to the sound card. Agent stations in the call center are interconnected on a LAN such that a supervisor at one station may monitor telephone conversations at another station having the connected telephone and sound card. In some instances a file-sharing application is used, allowing a supervisor to view a screen at the agent station as well as to monitor and participate in telephone conversations. The system provides a complete monitoring a service-observing capability in the call center.

11 Claims, 4 Drawing Sheets

METHOD AND APPARATUS FOR ENABLING FULL INTERACTIVE MONITORING OF CALLS TO AND FROM A CALL-IN CENTER

This application is a divisional of application Ser. No. 09/026,795, filed Feb. 20, 1998, now U.S. Pat. No. 6,047,060.

FIELD OF THE INVENTION

The present invention is in the field of computer telephony integrated (CTI) networks and has particular application to methods and apparatus including software for the purpose of third-party participation in agent call activity at agent stations.

BACKGROUND OF THE INVENTION

Telephone call processing and switching systems are, at the time of present patent application, relatively sophisticated, computerized systems, and development and introduction of new systems continues. Much information on the nature of such hardware and software is available in a number of publications accessible to the present inventor and to those will skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994.

At the time of filing the present patent application there continues to be remarkable growth in telephone-based information systems (intelligent networks) including Internet based networks. Recently emerging examples are telemarketing operations and technical support operations, among many others, which have grown apace with development and marketing of, for example, sophisticated computer equipment. More traditional are systems for serving customers of such as large insurance organizations. In some cases, organizations develop and maintain their own telephony operations with purchased or leased equipment, and in many other cases, companies are outsourcing such operations to films that specialize in such services.

A large technical support operation may serve as an example of the kind of applications of telephone equipment and functions to which the present invention pertains and applies. Consider such a system having a country-wide matrix of call-in centers, which is more and more a relatively common practice to provide redundancy and decentralization, which are often considered desirable in such operations. Also in such large organizations, business firms have a national, and in many cases a world-wide customer base. Such a system handles a large volume of calls from people seeking technical information on, for example, installation of certain computer-oriented equipment. These calls are handled by a finite number of trained operators distributed over the decentralized matrix of call centers.

In an intelligent network such as described above, incoming calls placed from anywhere in the Publicly Switched Telephone Network (PSTN) arrive at central telephony switches called in the art Service Control Points (SCP). An SCP is generally provided to be relatively close to a defined local area of callers. If the intelligent network is very large comprising many call centers then more than one SCP may be provided. Routing of incoming calls begins at the SCP.

A central router at the SCP typically routes incoming calls to other routers or telephony switches that are deployed throughout the network to provide further routing to call centers or customer information systems (CIS). Additional processors may be provided at the SCP for further computer enhancement. For example, when a call arrives at an SCP, information about the caller may be collected and processed to help determine routing for the call. Then, according to programmed routing rules, the call may be routed to an automatic call distributor (ACD) for further routing to a call center and then on to an available agent. In some networks (known to the inventor) information pertaining to the caller may arrive at an agent station before the call. Routing in an intelligent network may be accomplished on several levels according to many different protocols. It is the processor connected to the telephony switch that provides computer enhancement in an intelligent network.

Incoming calls are routed to an agent trained to handle the call according to protocols established by the company or organization hosting a destination call-center or centers. A large call center may have hundreds of agents logged in to the system and actively taking a variety of calls. As well as calls coming in, there may also be outgoing calls being placed by agents. Therefore, call monitoring capabilities or features are and have been an important tool for a call center manager to have at his or her disposal.

It is well established in the art that most large service organizations hosting call centers have a capability for monitoring telephone calls while an agent is actively communicating with the caller. For example, when calling to inquire about a telephone bill or perhaps an electric bill, a caller may hear a recorded voice prompt informing the caller that the call will be monitored for the purpose of training a new agent, etc. Mostly, this feature is used in the service industry, but is also utilized in other industries where there are legal considerations, or service quality concerns.

In current art, telephone call monitoring is basically limited to a manager or supervisor patching in to the phone call in process and listening to the agent handle the call via another telephone or headset. Typically, this is a transaction requiring the monitoring party to "conference in" in order to participate with an agent/client audio communication. Another more commonly used method for monitoring a telephone transaction is termed "passive monitoring" by those with experience in the art. Passive monitoring is the process of recording an individual transaction and then later playing it back.

A problem with the art in it's current state is that control of the monitoring process is largely limited to listening to the audio transaction and conferring with the agent during the call or after the call has ended. Although it is possible for the monitoring party to break in to the call, most often the call is transferred to the monitoring supervisor for disposition. For example, an agent supervisor may be listening to a call in process wherein there is a disagreement between the customer and the agent that requires intervention. In this instance, the supervisor would have to conference the call and attempt to mediate if immediate intervention were required. This is largely impractical because of the traffic levels that may be in effect over the lines. If there are many supervisors continually conferencing within the call center, a notable rise in network traffic could result. Therefore, most calls needing intervention are either transferred or passively monitored with the agent being consulted after the call creating a possible situation wherein the agent must place an outgoing call back to the customer with a remedy.

Another problem with current call monitoring capability relates to a lack of efficiency of service to the customer. For example, upon entering a current transaction between an agent and client, a monitoring supervisor is "cold" with regards to knowing the history, present particulars concerning the client, and so on. The monitoring party must hear the situation again after it has been once explained by the customer, and in some situations, must obtain other information that may be stored about the caller by making a second request, (after the agent's initial request), to a customer information system (CIS). For this reason, many larger organizations observe a policy of passive monitoring, with active monitoring occurring only on a random basis.

It is also true that in many modern call centers, agents have one or more telephones connected to a central switch, and also a computer platform, such as a PC. The PC may be connected on a local area network (LAN) with a computer-telephony-integration (CTI) processor also connected to the telephony switch, and the LAN may have one or more connected servers, such as a customer-oriented database. In such a system, an agent is typically capable of displaying information about a customer and a customer's situation on the PC display at the agent station, and special software for call-center management may also be capable of displaying instructions for the agent on the agent's screen, known in the art as scripting.

In a modern call center, then, the agent's activity and interactivity with a caller is not limited to the audio dialogue, but includes all of the activity, enabled largely by the PC and interconnectivity with other elements in the call center.

What is clearly needed is a method and apparatus including software whereby active monitoring can take place without increasing network traffic over conventional lines, and enable a monitoring party to interact from an informed position with regards to each customer's needs. The system also needs to be integrated with the entire range of tools at the agent's station, and with the applications the agent may use in interacting with a customer. Such a system would eliminate frustration and time delays associated with current methods.

SUMMARY OF THE INVENTION

In a preferred embodiments of the present invention, an interactive telephone-computer platform combination is provided, comprising a telephone having a microphone and a speaker for audio input and output respectively; a computer platform having a sound card coupled to an internal bus, wherein the sound card has a line-in port and a line out port; and an audio interface comprising a connected from the telephone speaker line to one or both of the sound card line-in port and line out port. In some embodiments the telephone speaker line is connected to both the sound card line-in and line-out ports, such that analog audio may be provided to the telephone speaker line from the computer bus through the sound card, and may be provided to the computer bus from the telephone. Resistors may be installed to protect drive circuitry in both the telephone and the sound card, and amplification circuitry may be used in the connected lines between the sound card and the telephone speaker line.

In another aspect of the invention a telephone-to-sound card connector is provided, comprising a first extension adapted for connecting to a microphone and speaker of the telephone; a second extension adapted for connected to microphone and speaker circuitry in the telephone, wherein the telephone speaker is connected to the speaker circuitry by a speaker line, and the microphone is connected to the microphone circuitry by a microphone line, through the first and second extensions; and a third extension adapted for connecting to one or both of microphone and speaker ports of a sound card expansion card. One or both of the microphone and speaker ports of the sound card may be connected to the speaker line between the telephone speaker and the telephone speaker circuitry. In some embodiments both ports are connected to the speaker line, such that analog audio may be provided to the telephone speaker line from the computer bus through the sound card, and may be provided to the computer bus from the telephone. Resistors may be installed in one or more of the lines within the connector to protect drive circuitry in both the telephone and the sound card. Also, amplification circuitry may be used in the connecting lines within the connector.

In yet another aspect a telephony call center is provided, comprising a first agent station having a computer platform connected to a local area network (LAN); and a second agent station connected to the LAN and having a computer platform and a telephone, wherein the computer platform is equipped with a sound card, the sound card having a microphone port for audio input and a speaker port for audio output, and wherein the telephone has a speaker, speaker circuitry for driving the speaker via a speaker line connecting the speaker circuitry and the speaker, a microphone, and microphone circuitry for receiving and processing audio input from the microphone; wherein the telephone at the second agent station has the speaker line connected to one or both of the microphone port and the speaker port of the sound card. The speaker line may be connected to both the sound card microphone port and the sound card speaker port.

In some embodiments of the call center control code at the first and second agent stations is adapted for enabling a person at the first agent station to monitor a telephone conversation conducted on the telephone at the second agent station, audio being supplied from the telephone via the telephone speaker line to the sound card microphone port, thence to an internal bus of the computer platform at the second agent station, thence via the LAN to the first agent station. In some embodiments as well, the control code at the first and second agent stations is adapted for enabling a person at the first agent station to join in to, as well as listen to, a telephone conversation conducted on the telephone at the second agent station, audio being supplied from the telephone via the telephone speaker line to the second card microphone port, thence to an internal bus of the computer platform at the second agent station, thence via the LAN to the first agent station, and from the first agent station via the LAN to the computer platform at the second agent station, thence to the internal bus at the second agent station, thence to the sound card, thence to the telephone via the sound card speaker port.

In still other embodiments the control code further comprises file-sharing code, whereby the person at the first agent station may, on a display monitor of the computer platform at the first agent station, also view and interact with a display on a display monitor at the second agent station. In other embodiments the control code comprises code enabling telephone conversations on the telephone at the second agent station to be recorded at one or both of the first agent station and the second agent station. In yet other embodiments there may be a data server connected to the LAN, wherein the control code comprises code adapted for archiving telephone conversations on the telephone at the first agent station in a database at the data server. In some embodiments wherein telephone conversations are recorded, there may be a transaction log facility, whereby transactions at the second call center are logged, and wherein saved voice files are associated with logged transactions, such that voice files associated with transactions may be retrieved and reviewed.

In embodiments of the invention, for the first time, service-observing is provided in a manner that a third party may completely monitor and participate in agent activities in a call center, making it possible to monitor agent activities, record conversations, relate recorded conversations to transactions logged separately, and so forth.

BRIEF DESCRIPTION OF THE DRAWING FIGURES

DESCRIPTION OF THE PREFERRED EMBODIMENTS

Figure 1:
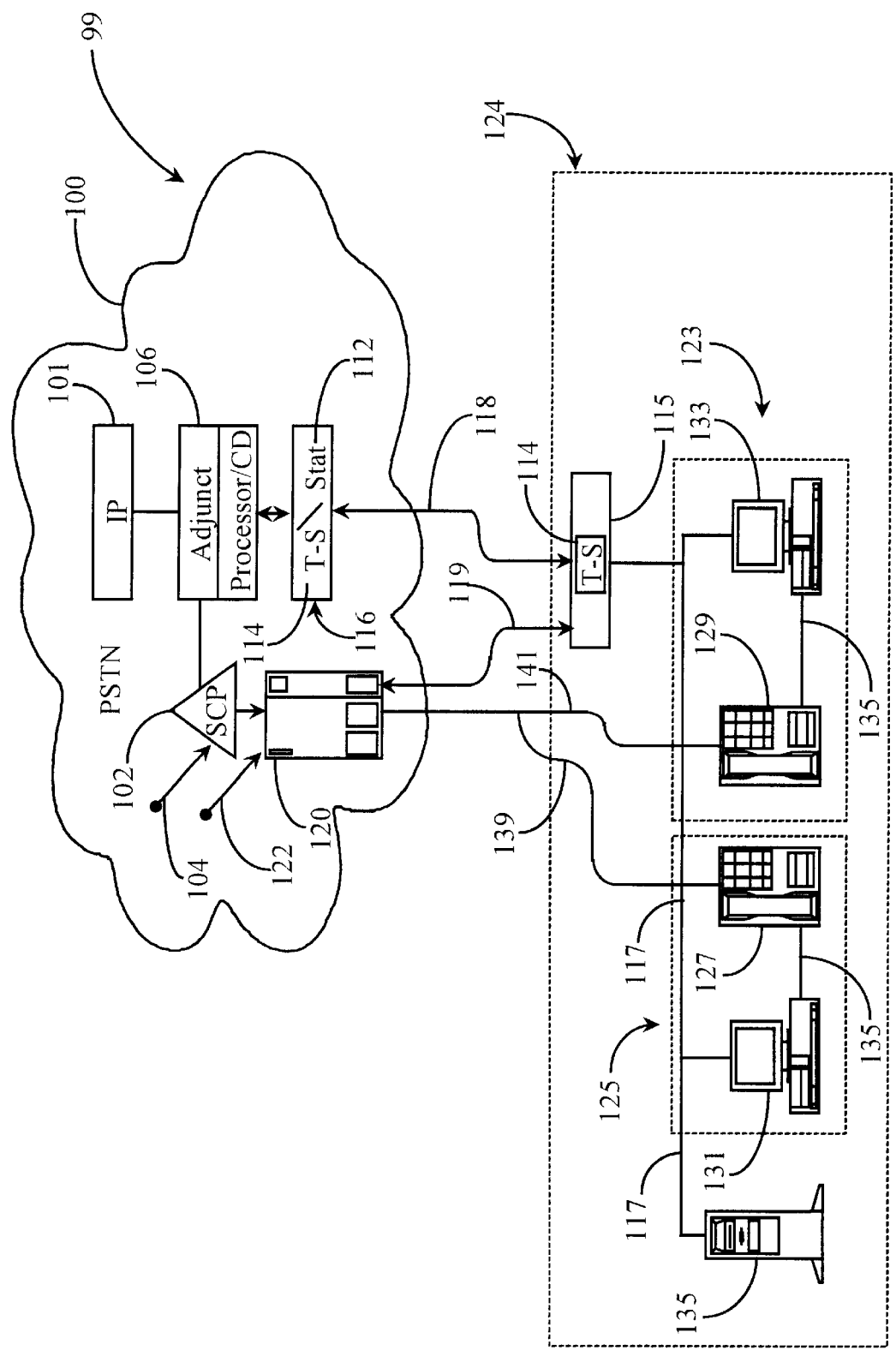
FIG. 1 is an overview simple overview of a CTI network with call monitoring capabilities according to an embodiment of the present invention.

FIG. 1 is an overview of a network with a call center having call monitoring capabilities according to an embodiment of the present invention, wherein interactive call monitoring (both active and passive) can be practiced. Network 99 in this example comprises a Publicly Switched Telephone Network (PSTN), represented by a cloud 100, and a distributed call 124. Network 99 may also be of the form of a private network such as a private company wide area network (WAN). In another embodiment, cloud 100 may be the Internet or a combination of the Internet and a telephone network. In this simple embodiment, the inventor has chosen to illustrate the present invention as it can be used in a typical intelligent network such as network 99.

Incoming telephone calls are represented by vector 104. Calls 104 arrive at a service control point (SCP) 102. In a large computer-network capable of distributing calls to call centers such as call center 124. Routing performed at SCP 102 distributes calls 104 to appropriate telephony switches such as switch 120 in the network.

In an intelligent network such as network 99, computer enhancement to various switches in the network such as telephony switch 120 is accomplished via digital linking to a computer processor or processors adapted to provide such enhancements. Such equipment may include, but is not limited to, an adjunct processor 106 to provide call distributing capability, an intelligent peripheral (IP) 101 for identifying and compiling information about callers, and a processor 116 running instances of a T-server 114 and a Stat-server 112 to further aid in routing calls.

In this example, information collected about a caller is transmitted via digital connection 118 to a processor 115 running an instance of a CTI-application 114 the inventors term T-server, which is connected to a local area network (LAN) 117 operative within call center 124. Such elicited information forwarded to a call center may be transmitted via LAN 117 to an agent's PC, such as PC 131 in agent station 125 or PC 133 in agent station 123. Stored information about the caller can be accessed from a database on a connected processor 135 as well, using information such as the caller ID as a key, and may be displayed at an agent's station. Statistical information may also be shared from the call centers to Stat-server 112 via link 118 so that additional enhanced routing may be performed at the network level.

Referring now to agent stations 123 and 125 in call center 124, it will be apparent to one with skill in the art that there may be many more agent stations than the two shown within call center 124 without departing from the spirit and scope of the present invention. Also, an agent station may be operated as a supervisor's station, with the supervisor's station equipped much as an agent station. In the present examples station 123 will be presumed to be a supervisor's station, and station 125 will be considered as representative of multiple agent stations, all connected on LAN 117.

Agent station 125 comprises a telephone 127 and a PC 131. Telephone 127 is connected to public telephony switch 120 via telephone channel 139. PC 131 is connected to LAN 117. PC 131 is also connected in an embodiment of the invention via a unique receiver modular cable 135 from telephone 127 for the purpose of providing audio sharing between the telephone and the sound system of PC 131. This approach provides interactive ability for the telephone audio to be digitized and processed by the PC, and through the LAN to other PCs on the LAN, particularly to supervisor's PC 133. Audio data may also come from the PC to the telephone by the same connection in some embodiments. In a preferred embodiment of the invention, each PC at an agent's station is equipped with a sound card, as is usual for what are now known as Multi-media PCs, and the telephone is connected to the input and output of the sound card. This connectivity is described in further detail below.

For the purpose of audio sharing, as described above, there are data exchange protocols known in the art which may be utilized. In a preferred embodiment the protocol implemented is according to the H.323 standard approved in 1996 by the International Telecommunications Union. This is an umbrella standard for multimedia communication (audio, video, and data) across IP-based networks, including the Internet, and applies also to Lan-based communication. Detail regarding H.323 may be found in a number of references and the like, one of which is a DataBeam™ WEB page having the URL <http://gw.databeam.com/h323/h323primer.html>.

Supervisor station 123 comprises a telephone 129 and a PC 133. Connectivity of the supervisor's PC 133 and the supervisor's telephone 129, in this embodiment, is identical to that of agent's PC 131 and agent's telephone 127. A telephone channel 141 and a modular connector cable 135 provides said connectivity to public telephony switch 120, and special connection between supervisor's telephone 129 and supervisor's PC 133 respectively. Supervisor's PC 133 is also connected to LAN 117.

It will be apparent to one with skill in the art that in this embodiment, a supervisor station such as supervisor station 123 may also function as an agent station such as agent station 125, with the exact opposite also true. However, in another embodiment, a supervisor station may be set up only to perform call monitoring with the required connections to LAN 117 enabled. In the aforementioned embodiment, a monitoring station such as supervisor station 123 need not have a telephone connected to PC 133.

As described above, connection between a telephone and a PC such as is the case concerning agent's telephone 127 and agent's PC 131, provide the enhanced monitoring capability according to various embodiments of the present invention that are further detailed below.

Figure 2:
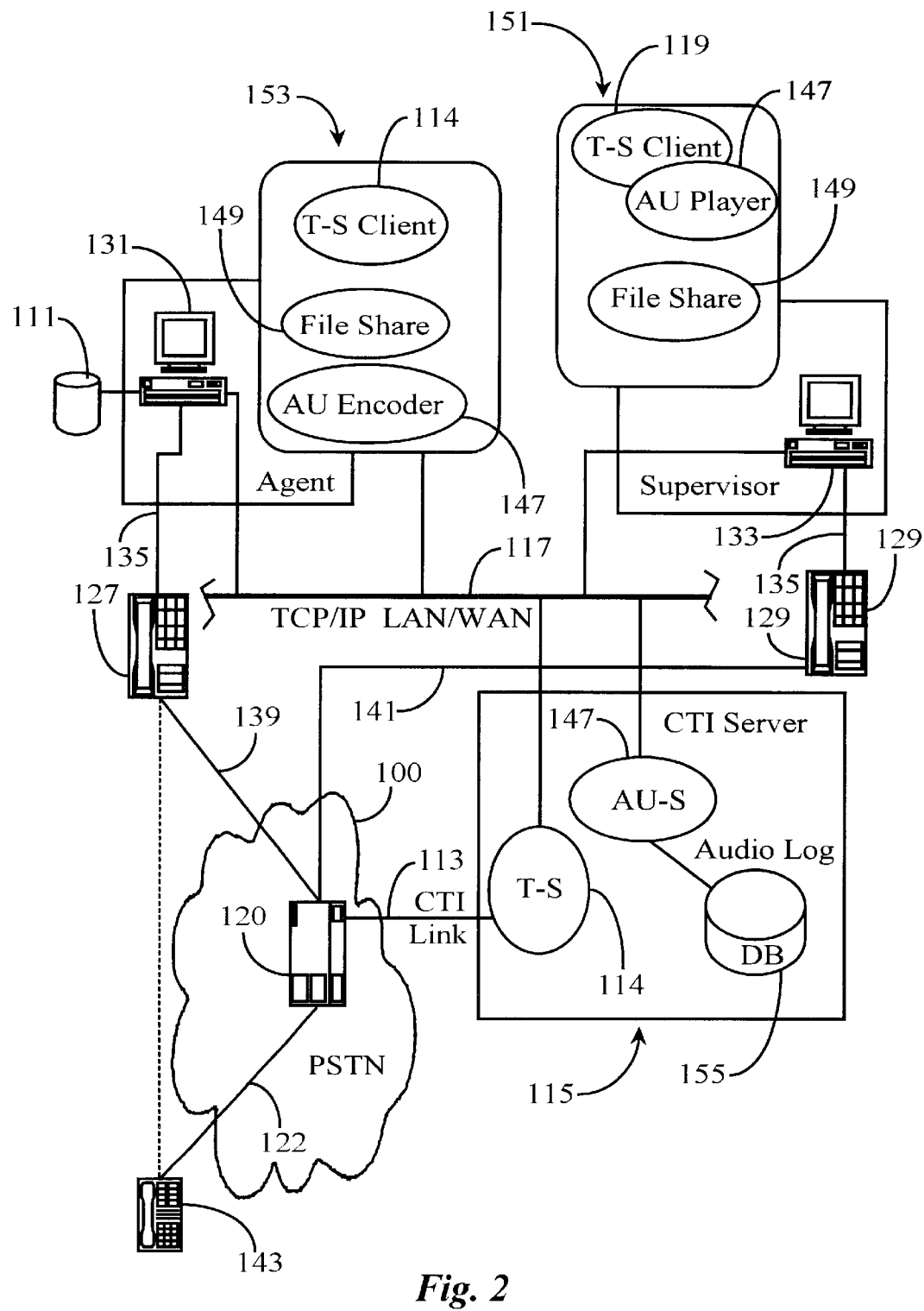
FIG. 2 is a sdiagram illustrating topology to software and connection of a system practicing the present invention within a call center according to an embodiment of the present invention.

FIG. 2 is a diagram illustrated topology and software functionality of call center 124 of FIG. 1, and connection to the network according to an embodiment of the present invention, wherein an agent's computer 131 has a software suite 153 comprises an instance of T-server application (T-S) 114, an instance of a file-sharing application 149, and an instance of an audio-sharing application 147 with an encoding function displayed.

In a preferred embodiment, file-sharing is implemented according to the ITU's T..120 standard protocol, which provides application and data sharing capabilities. The T.120 standard uses several communications and applications protocols and begins at the transport layer to provide a platform-independent, standardized, multipoint data-conferencing conferencing environment. The T.120 standard is well-known in the art, and further details are available from the ITU and various WEB pages on the Internet, among other sources.

In this embodiment, an agent taking calls on agent's phone 127 is being actively monitored by a supervisor operating supervisor's PC 133. The supervisor's PC also executes a software suite 151 with instances of T-server 114, file sharing application 149, and audio-sharing application 147 with a player displayed. Connection between supervisor's PC 133 and agent's PC 131 is via LAN 117. T-server Client 119 is an application operative to interact with the CTI T-server application 114 executing on CTI processor 115 in this embodiment. This application executing on the agent's PC provides a GUI displaying an indicator for the agent's telephone or telephones, by which the agent may manipulate the functions of his/her telephones through the PC. An agent may, for example, signal via the GUI to hang up the telephone. A signal is sent via LAN 117 to T-Server 114 at processor 115, which operates through switch 120 via CTI link 113 to accomplish the agent's instruction.

File-sharing application 149, preferably a T.120 enable application, may be of the form of any one of several commercially available conferencing applications known in the art and to the inventor. Such applications are commonly used to exchange files, messages and the like. NetMeeting™, which is a product of Micosoft Corporation is one such sharing application.

The innovative apparatus and method of the present invention in several embodiments combines various software application capabilities as described above, with the unique connection between an agent's telephone, such as telephone 127, and an agent's PC such as PC 131. These connections are those indicated as 135 in both FIGS. 1 and 2. Connection 135 connects the agent's telephone 127 to a sound card on agent's PC 131 so that an active call to the agent can be heard by a monitoring supervisor using supervisor's PC 133. The supervisor has the capability, with the appropriate software applications, of monitoring calls, talking to the agent, sharing files with the agent, and doing special, real time scripting to the agent while a call is in progress. Information is carried to and from each PC over LAN, which in some embodiments may be TCP/IP-enabled.

As an example of functionality, a customer calling from customer's telephone 143 via line 122 is routed at public switch 120 to agent's telephone 127 via telephony channel 139. When the agent picks up the call, both sides of the conversation are carried over connection 135 into the sound card input in agent's PC 131. A supervisor operating supervisor's PC 133 may begin active monitoring via audio sharing application 147. Audio input from the conversation is encoded on the agent's side and sent via LAN 117 to the supervisor's PC 133 running an instance of an audio-sharing application 147, and may also be sent to CTI processor 115 (FIG. 1) running an instance of audio sharing application 147. At the CTI processor the transaction could also be tagged and stored in a data base 155 for later reference as would be the case with passive monitoring. In some embodiments the necessary applications for the database activity may be accomplished on a separate processor connected to LAN 117, it is not required that the functions be provided exactly as shown in FIG. 2, which is exemplary.

As it is known in the art to provide scripting to an agent for PC display, and data in a number of different formats for use possibly during active calls, it is desirable that a supervisor be capable of viewing the same display that the agent views while a call is monitored.

File sharing between agent's PC 131 and supervisor's PC 133 is provided by any of several commercially-available file-sharing applications and communication over LAN 117, or by a proprietary application running on both PCs. By such an application a supervisor may "look" at the agent's screen over LAN 117, or, in another mode the supervisor may control the display on the agent's screen, a capability that has many more uses in a call center operation.

In a manner similar to the automatic or triggered archiving of audio content of a call session, the screen content of a call session may also be archived by suitable software running on processor 115 or similar processor connected on the LAN.

The capabilities provided in embodiments of the invention described make it possible for a supervisor to passively monitor calls at agent stations, to participate in the calls, to communicate with the agent transparent to the caller, to view the agents screen including scripting provided by managing software in the call center, and to provide real-time aid and instruction, as well as to select audio and graphics archiving, which may be suitably time and date stamped, and otherwise identified for later use. Additionally, a supervisor, by well-known multi-tasking capability, monitor and participate in the activities of several agents, limited only by a supervisor's ability to efficiently and effectively accomplish such interaction.

In one embodiment, a supervisor may be in charge of monitoring the transactions of, for example, 15 agents. An audio signal, a flashing icon, or other alert on the supervisor's desktop might indicate an agent or agents beginning a session. By clicking on that agent's icon active voice monitoring would commence, and so on. It will be apparent to one with skill in the art that desktop interfaces for data sharing applications may use a number of differing techniques related to user input without departing from the spirit and scope of the present invention, such as the use of icons representing agents, pop-up notifications, audio signals, and so on. Further detail regarding additional monitoring and management capabilities that can be adapted to an embodiment of the present invention are described below.

In another aspect of the invention, an agent, by use of audio software represented by element 147 in FIG. 2, may encode and store audio transactions locally at the agent's station. An H.323-enabled application which has an encoder, will provide the needed functionality, and the database may be on any suitable non-volatile drive accessible by the agent's PC, represented in FIG. 2 by database 111. Although database 111 is shown in FIG. 2 as connected directly to PC 131, as would be the case if it were on a local hard drive, for example, it could be on a processor connected to LAN 117.

Figure 3:
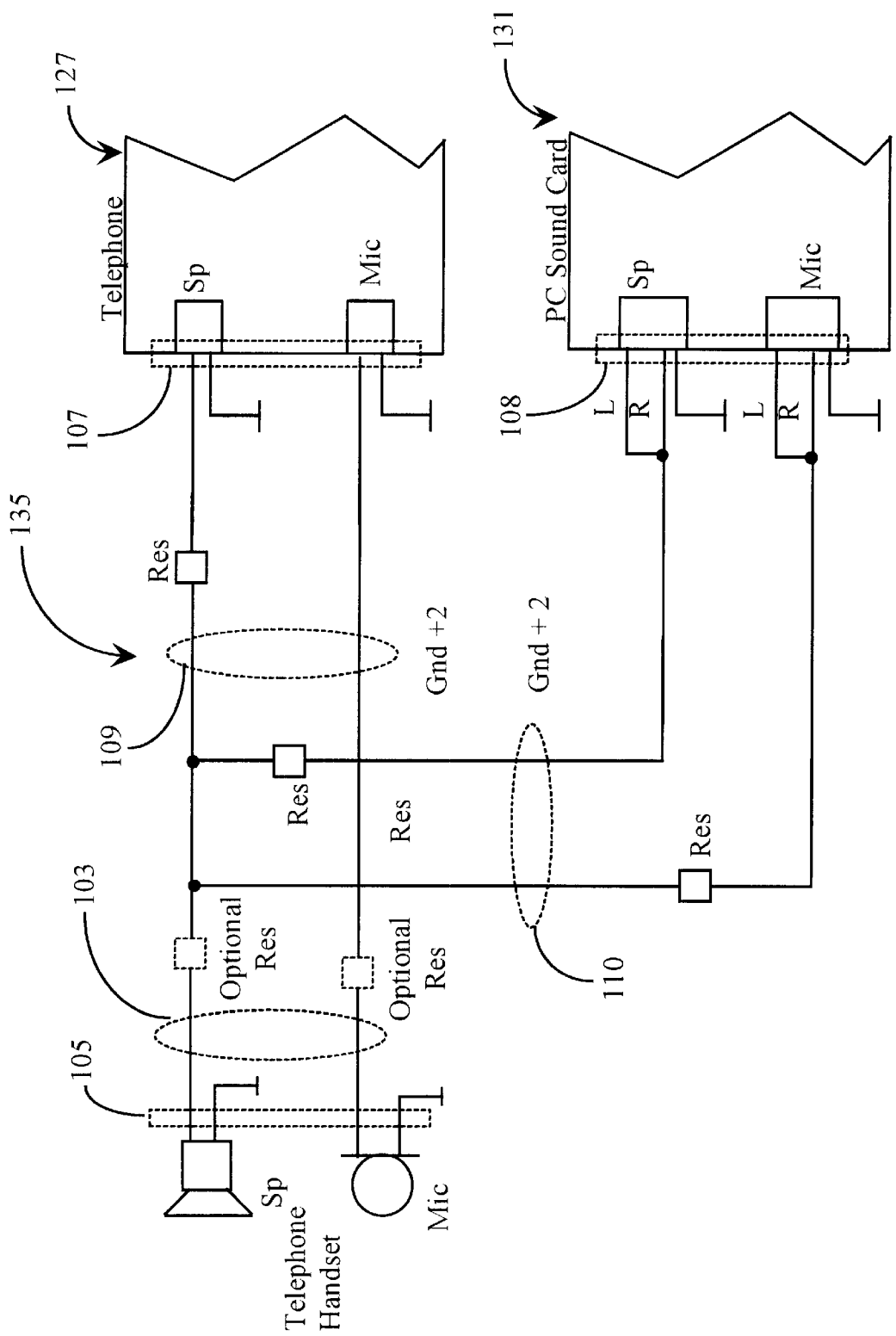
FIG. 3 is a diagram illustrating an agent telephone to PC connectivity according to an embodiment of the present invention.

FIG. 3 is a diagram illustrating one mode of connectivity for an audio interface between an agent's telephone 127 and an agent's PC 131 in an embodiment of the invention. In FIG. 3 modular connector set 135 represents a three-tailed connector according to an embodiment of the invention for enabling a telephone to operate with a PC as described in various embodiments herein. Conventionally a single telephone cable connects a telephone handset for telephone 127 at an agent's station with the telephone. It will be apparent to those with skill in the art that the handset representation could also be a headset having a speaker and microphone, or a speakerphone also having a speaker and a microphone. This cable connects the speaker and microphone in the handset/headset with the appropriate circuitry in the telephone, as is known in the art, and typically there are modular jacks and plugs on both ends of the cable. In the case of a speakerphone there is not necessarily a conventional cable and plugs, but suitable accommodations will be apparent to those with skill in the art.

Modular connector 135 as shown in FIG. 3 replaces the conventional cable between the handset/headset and the telephone in a manner that the handset/headset speaker line may also be connected to the line-in and line-out plugs of a sound card connected to the internal bus of the agent's PC. Once the conventional cable between the telephone handset and the telephone is removed, one "tail" of connector 135 plugs into modular jack 105 at the handset/headset, one tail plugs into modular jack 107 at the telephone, and one plugs into the sound card interface 108 at the PC.

One port at the sound card is typically the "line out" port, often labeled as a speaker output, and may have left and right (L and R) connection points, if the output is a stereo output. The Mic port at the sound card is "line in" and may also be stereo as shown. In the event the connections are stereo, the modular connector at this point will join the L and R lines as shown. As is seen in FIG. 3, both in and out at the sound card is connected to the speaker line at the telephone. The reason for this is, that in the telephone, audio on the speaker line is shared on the microphone line, and vice versa. Only the speaker line connection is needed to provide both sides of a telephone conversation to the sound card, and to allow the sound card to provide audio converted from the computer bus to the telephone.

Typically, then, cable portions 103, 109, and 110 will each have a ground+two active lines. In some embodiments resistors may be used to enhance voice quality as shown. In other embodiments, at the point the three portions of modular connector 135 join, there may be a structure comprising amplifiers. It will be apparent to those with skill in the art that the connections and structure to join the audio capability of the telephone to the line in and line out ports of the sound card may be implemented in a number of essentially equivalent ways. In the case of a speaker phone there may be internal wiring connection made in lieu of the modular jacks and plugs shown. In other embodiments other accommodations may need be made to accomplish the essential connectivity indicated in the example shown.

Figure 4:
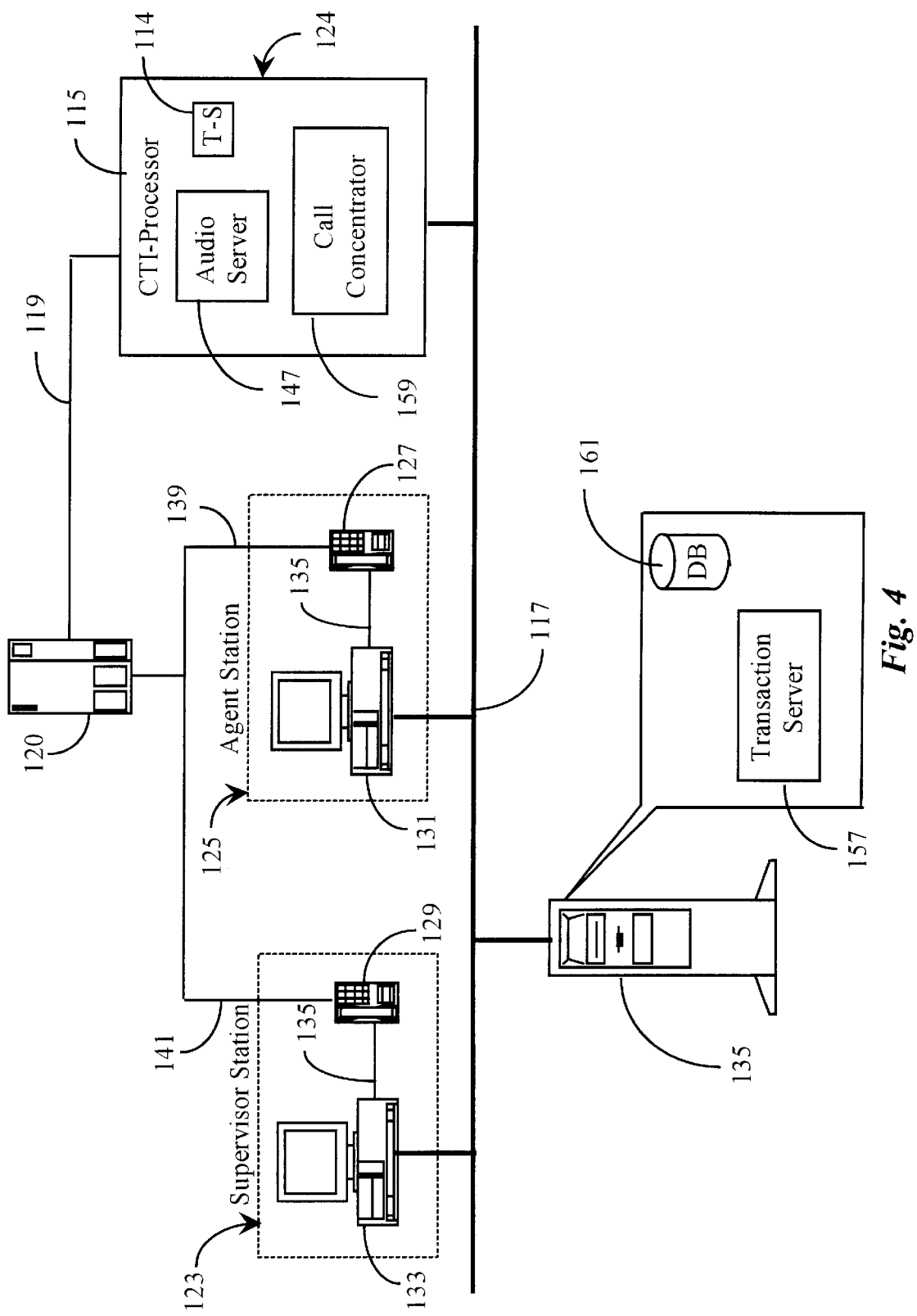
FIG. 4 is a diagram illustrating software and connectivity in an embodiment of the present invention.

FIG. 4 is a diagram, somewhat redundant, showing again LAN 117 from FIG. 1 and FIG. 2, with LAN-connected processors connected for the purpose of illustrating additional functionality enabled by the unique telephone to sound card connection described in detail above. In FIG. 4 the physical connectivity of telephony switch 120, agent stations 125, supervisor's station 123, CTI-processor 115, LAN 117, and a representative LAN server 135 is shown, as also shown in FIGS. 1 and 2. Telephone 129 is shown connected to PC 133 by a modular connector 135, as is telephone 127 and PC 131, enabling audio sharing between the PCs and the respective telephones, which allows audio data to be shared among various processors and software applications interconnected by LAN 117.

In FIG. 4, additional applications are shown as resident and executing on LAN server 135 and on CTI server 115. In practice, such applications could operate on essentially any processor connected to LAN 117, including CTI processor 115. It is convenient, however to indicate the functionality as shown in FIG. 4. In FIG. 4 a Transaction Server application 157 is shown operating on LAN-connected processor 135. This application tracks and logs all transactions in the call center. In particular cases, such as a call center wherein products or services are sold, including such as securities and the like, the transaction server may do specific records of quantities, prices, costs, and so on, for each transaction. It will be apparent to the skilled artisan that there are many forms that such a transaction recording application may take, depending on the physical nature and the purposes of the call center. In this example, a database 161 cooperates with Transaction Server 157, and is the repository of the transaction records. This database may be in addition to database 155 shown in FIG. 2 upon which voice data is recorded. Ion some embodiments a single database may be used.

Another application, termed a Call Concentrator, is shown operable on CTI Server 115. This application cooperates with call center management software in a manner providing, among other things, services to a supervisor, allowing a supervisor to schedule monitoring of agent's calls. A supervisor, through a client application at his PC, may request being connected to a particular agent's calls, for example, on a percentage basis, or according to type call, or call origin and the like.

In one aspect of the invention recorded calls are associated with transactions, allowing a supervisor, or other management personnel, to retrieve recorded calls for any particular transaction, and review the calls. This feature is particularly useful in situations wherein a dispute might after a transaction as to the nature, content, or result of a transaction. Such disputes may be quickly resolved by reviewing a recorded call. In this aspect of the invention recorded calls are given a file name when they are recorded in a database, such as DB 155 in FIG. 2. A tag is added to the transaction record recorded in such as database 161 of FIG. 4 for the particular transaction to which the call pertains. At a later time, then, when a transaction may need to be reviewed, the associated call may be retrieved and reviewed as well.

It will be apparent to one with skill in the art that there are many other embodiments wherein the method of the present invention can be practiced without departing from the spirit and scope of the present invention. For example, in one embodiment, the present invention may be practiced in an Internet-based telephony system, such as a system based on the well-known H.323 protocol, or a combination of an Internet and public telephony network utilizing a distributed CTI call center scenario. In another embodiment, monitoring capability may be extended beyond individual call centers via call center-connected WAN. In still another embodiment, the method and apparatus of the present invention could be adapted to wireless forms of transmission either in whole or in part.

The use of the features of the present invention in and with Internet Protocol Network Telephony (IPNT) is of particular interest. Call centers with the general organization of the call center illustrated in FIGS. 1–4 may be provided, with LAN or WAN-connected agent stations based primarily on computer platforms such as PCs. In such a call center, one server may be Internet-connected whereby IPNT calls may be received and distributed to agent stations. Service observing features may be provided in such a call center in essentially the same manner as shown for the calls center described in detail herein. Call centers may, of course, be multi-media, wherein calls of either or both types may be handled, and calls may be transferred between types. In such a a calll center the unique telephone-to-sound card interconnectivity may be used. In such a case, IPNT calls may be taken over a "standard" telephone connected to the PC sound card in the manner taught herein.

It will also be apparent to one with skill in the art that agent training could be implemented by using the call monitoring software. For example, during an active call a monitoring supervisor could provide agent scripting of the form of pop-up text to the agent's desktop so that he could read the script to the caller and so on. Likewise, many other interactive features could be added and integrated to a desktop interface supporting the various aspects of call monitoring that have already been described. These include but are not limited to the use of icons representing agents and events; the use of OLE (drag and drop mirroring) for file transfers; the use of sound alerts for target monitoring; and so on. In still other embodiments wherein multimedia applications are used such as on the Internet, monitoring capability may be extended to E-mail, Internet phone transactions, and so on. There are many possibilities of which many have been noted. The spirit and scope of the present invention is limited only by the claims that follow.

What is claimed is:

1. A System for agent-management and supervision in a call center, comprising:

one or more agent stations and a supervisor station in the call center, each station having a computer platform and a telephone, the telephones integrated with the computer platforms in a manner providing audio on the telephones as digital data to the computer platforms, with the computer platforms interconnected through a local area network (LAN); and client software at the agent stations and control software at the supervisor station;

characterized in that the control software provides display indicia representing active agent stations, such that selection of an indicia by a supervisor enables the supervisor to monitor and/or participate in calls at the agent's station.

2. The system of claim 1 wherein the software further provides ability for the supervisor to view a duplicate of a display at the agent's computer platform.

3. The system of claim 1 wherein interaction between the supervisor station and the agent stations include at least one of providing real-time aid and instruction to the agents, participating in the calls, communicating with the agent transparent to the caller, and selecting audio and graphics for archiving.

4. The system of claim 1 wherein the indicia at the supervisor station comprise at least one of an audio signal, a flashing icon representing an individual agent, and pop-up notifications on the supervisor's desktop.

5. The system of claim 1 wherein by clicking on an agent's icon, passive monitoring and/or interaction between the supervisor station and the agent station would commence.

6. The system of claim 1 wherein a supervisor station monitors and participates in the activities of several agents simultaneously.

7. A method for agent-management and supervision in a call center, comprising steps of;

(a) interconnecting each one of an agent station and a supervisor station in a call center to a local area network (LAN), each station having a computer platform and a telephone, the telephones integrated with the computer platforms in a manner providing audio on the telephones as digital data to the computer platforms;

(b) providing client software at the agent stations and control software at the supervisor station;

(c) providing display indicia at the supervisor station, via the control software, representing active agent stations, (d) selecting the indicia by a supervisor, enabling the supervisor to monitor and/or participate in calls at the agent's station.

8. The method of claim 7 wherein in step (d), selecting the indicia further provides ability for the supervisor to view a duplicate of a display at the agent's computer platform.

9. The method of claim 7 wherein in step (d) participation includes interaction between the supervisor station and the agent stations of at least one of providing real-time aid and instruction to the agents, participating in the calls, communicating with the agent transparent to the caller, and selecting audio and graphics for archiving.

10. The method of claim 7 wherein in step (c), the indicia at the supervisor station comprise at least one of an audio signal, a flashing icon representing an individual agent, and pop-up notifications on the supervisor's desktop.

11. The method of claim 7, wherein in step (d) the supervisor monitors and participates in the activities of several agents simultaneously.

* * * * *